Figure 1:
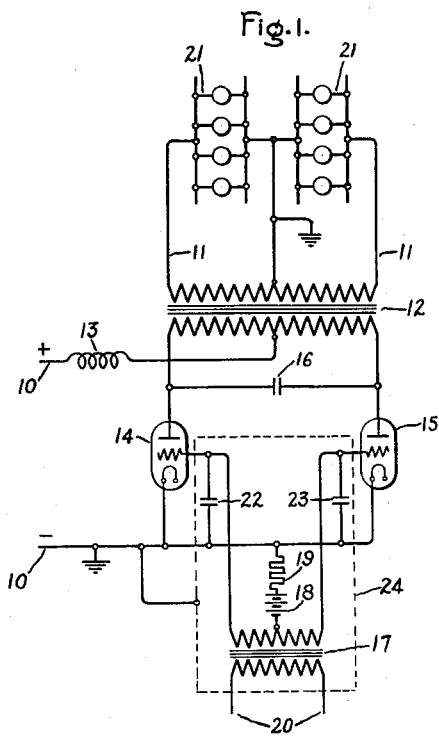

Nov. 28, 1933.    C. H. WILLIS    1,937,369
ELECTRIC VALVE CIRCUIT
Filed Oct. 1, 1931

Inventor:
Clodius H. Willis,
by *Charles E. Tullar*
His Attorney.

Patented Nov. 28, 1933

1,937,369

UNITED STATES PATENT OFFICE 1,937,369

ELECTRIC VALVE CIRCUIT

Clodius H. Willis, Princeton, N. J., assignor to General Electric Company, a corporation of New York Application October 1, 1931. Serial No. 566,374

3 Claims. (Cl. 175—363)

My invention relates to electric valve circuits and more particularly to such circuits including valves of the vapor electric discharge type.

Heretofore there have been devised numerous apparatus including electric valves for transmitting energy between direct current circuits, direct and alternating current circuits, or alternating current circuits of different frequencies, voltages, phases, etc. In such electric valve converting apparatus it has been found particularly advantageous to use valves of the vapor electric discharge type because of the relatively large amounts of power which may be handled at ordinary operating voltages. In the majority of the arrangements of the prior art, however, the several electric valves are adapted to be rendered conductive periodically for short intervals of time and to be maintained non-conductive periodically for other intervals of time. In such apparatus it has been customary to maintain the valves non-conductive during the desired intervals by impressing a negative potential upon the control grids, this potential being either a periodic potential, each cycle of which has an appropriate negative period, or a unidirectional negative bias potential upon which is superimposed a periodic potential, the positive periods of which are sufficient to render the grid positive during the intervals in which the valve is to be made conductive.

In many of the electric valve converting apparatus it has been found that periodic transients of very steep wave form are set up in the apparatus due to the sudden transfer of the load current between the several electric valves. In case these transients are impressed across a non-conducting electric valve with such a polarity that the anode is made positive with respect to the cathode, there are two effects which may combine to overcome the negative bias of the grid and deprive the grid of the control of the conductivity of the valve. In the first place, the internal capacity between the grid and anode of an electric valve is often sufficient to permit a potential to be electrostatically induced upon the grid, of such a magnitude as to overcome the grid bias and render the valve conducting. In the second place the grid control circuit of the valve usually contains several elements or pieces of apparatus, such as a grid resistor, a bias battery, a grid transformer, etc. It has been found that in many cases the electrostatic capacity of the power circuit, which usually contains transformers, reactors, etc., with respect to the elements of the grid circuit induces in the grid circuit a potential which tends to overcome the negative grid bias and thus deprives the grid of control.

In the copending application of Alan Howard, filed October 1, 1931, Serial No. 566,376, and assigned to the same assignee as the present application, there is disclosed an arrangement by means of which the effect due to the internal capacity between the grid and anode of the valve may be eliminated by connecting between the grid and cathode of the valve a capacitor substantially greater in magnitude than that of the grid anode capacity. In many cases, however, if this grid-cathode capacity be increased to such a value as to eliminate also the second effect mentioned above, that is, the electrostatic capacity between the various elements of the power circuit and the elements of the grid circuit, the impedance of the grid circuit becomes so low that the limited source of control energy available is unable to maintain a control voltage of sufficient magnitude to insure satisfactory operation, and the capacity of the grid circuit becomes so great that the grid circuit becomes very sluggish due to the time delay action of the grid capacity. My invention constitutes an improvement upon the arrangement of the above described application by means of which the above mentioned effect of transient voltages in the power circuit upon the elements of the grid circuit may be eliminated.

It is an object of my invention, therefore, to provide an improved excitation circuit for vapor electric discharge valves, which will overcome the above mentioned disadvantages of the arrangements of the prior art and which will be simple and reliable in operation.

It is another object of my invention to provide an improved grid excitation circuit for vapor electric discharge valves which will avoid the possibility of the grid losing control of the valve upon the occurrence of transients in the valve circuit.

It is a further object of my invention to provide an improved grid excitation circuit for vapor electric discharge valves which will substantially eliminate the effect of transients in the valve circuit upon the grid circuit of the valve, and at the same time will not cause a substantial lag in the grid circuit.

In accordance with my invention the effect of transient positive voltages in the anode circuit of a vapor electric discharge valve on the grid and grid circuit of the valve, tending to deprive the grid of control over the conductivity thereof, is eliminated by connecting between the grid and cathode of the valve a condenser having a capacity substantially greater than the internal capacity between the grid and anode of the valve, and by surrounding the several elements of the grid circuit of the valve with a conductive shield and connecting this shield to the cathode of the valve. By this arrangement any electrostatically induced potentials on the grid or in the grid circuit, due to transient voltages occurring in the anode circuit of the valve, are substantially eliminated.

Figure 2:
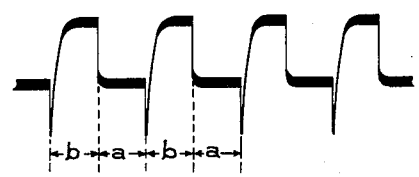

For a better understanding of my invention, together with other and further objects thereof, reference is had to the following description taken in connection with the accompanying drawing and its scope will be pointed out in the appended claims. Fig. 1 of the accompanying drawing illustrates an electric valve converting apparatus embodying my invention for transmitting energy from a direct current supply circuit to an alternating current load circuit, while Fig. 2 is a copy of an oscillogram of certain operating characteristics of the apparatus of Fig. 1 to aid in the understanding of the invention.

Referring now to Fig. 1 of the drawing, there is illustrated an electric valve converting apparatus embodying my invention of the type known in the art as a parallel inverter, adapted to transmit energy from a direct current supply circuit 10 to an alternating current load circuit 11. This apparatus comprises a transformer 12 having a secondary winding connected to the alternating current circuit 11 and a primary winding provided with an electrical midpoint connected to one side of the direct current circuit 10 through a smoothing reactor 13 and a pair of end terminals connected to the other side of the direct current circuit 10 through vapor electric discharge valves 14 and 15. A commutating capacitor 16 is connected between electric valves 14 and 15. The vapor electric discharge valves 14 and 15 are each provided with an anode, a cathode and a control grid for controlling the starting of current in the anode-cathode circuit.

The grids of the valves 14 and 15 are connected to their common cathode circuit through opposite halves of the secondary winding of a grid transformer 17, a negative bias battery 18 and a current limiting resistor 19. The primary winding of the grid transformer 17 may be energized from any suitable alternating current circuit 20 of the frequency which it is desired to supply to the circuit 11, or in case the circuit 11 is connected to an independent source of electromotive force for determining its frequency, the primary winding of the transformer 17 may be energized therefrom through a suitable phase advancing condenser, as will be well understood by those skilled in the art. The load circuit 11 is illustrated as being of the three wire grounded neutral type connected to the load devices 21. The negative side of the direct current circuit is also preferably grounded.

In order to eliminate the effect on the control grids of the valves 14 and 15 of transient electric waves in the anode circuits of these valves, the grids are connected to their respective cathodes through capacitors 22 and 23, respectively. In order to eliminate the effect of transients occurring in the power circuit of the apparatus upon the various circuit elements of the grid circuit, these elements, including the grid transformer 17, the negative bias battery 18, resistor 19 and capacitors 22 and 23, are enclosed within a conductive shield 24 which is connected to ground as illustrated.

The general principles of operation of the above described apparatus will be well understood by those skilled in the art, or may be found explained in detail in United States Letters Patent No. 1,800,002, granted April 7, 1931, upon the application of E. F. W. Alexanderson. In brief, if one of the electric valves, for example valve 14, is initially made conductive by a positive half cycle of grid potential from the transformer 17 of such a magnitude as to overcome the negative bias of the battery 18, current will flow from the positive side of the direct current circuit through the left hand portion of the primary winding of the transformer 12 and electric valve 14 to the other side of the direct current circuit. During this interval, capacitor 16 will become charged to a potential substantially twice that of the direct current circuit, and, when electric valve 15 is made conductive, the potential of this capacitor is effective to transfer the current from the valve 14 to the valve 15. The current will now flow through the right hand portion of the primary winding of the transformer 12, electric valve 15, to the other side of the direct current circuit. In this manner current is successively commutated between electric valves 14 and 15, flowing in opposite directions through the primary winding of the transformer 12 and thus supplying an alternating potential to the circuit 11. In case the alternating current circuit 11 is connected to an independent source of electromotive force, it will be understood that the capacitor 16 may be omitted and the primary winding of the grid transformer may be energized from the alternating current circuit 11, in which case the electromotive force of the transformer 12 is effective to commutate the current between the electric valves.

In Fig. 2 there is illustrated a copy of an oscillogram of the potential appearing across one of the electric valves in a circuit of the type illustrated in Fig. 1. The portions $a$ of this curve represents the intervals during which the valve is conducting current so that potential across the valve is only the arc drop of the valve, which remains substantially constant. The intervals $b$ of this curve represent the periods during which the valve is nonconducting. It will be seen that, during the initial portion of these intervals $b$, the anode potential of the valve rises very rapidly to a high positive value. As explained in more detail in the copending application of Alan Howard, Serial No. 566,376, referred to above, the capacity between the grids and anodes of the valves 14 and 15 causes a potential to be electrostatically induced upon the control grids, the magnitude of which depends upon the interelectrode capacities of the valves. By means of the capacitors 22 and 23 connected between the grids and anodes of the valves, the ratio of these interelectrode capacities may be so adjusted that the potential electrostatically induced upon the control grid may be reduced to any predetermined value. However, it has been found that the capacity of the apparatus included in the power circuit, such for example as the reactor 13 and transformer 12, has a considerable capacity to ground, as does the apparatus included in the grid circuit, that is the grid transformer 17, the battery 18 and resistor 19, and capacitors 22 and 23. Therefore transients occurring in the power circuit of the apparatus also electrostatically induce potentials in the various elements of the grid circuit which may tend to overcome the negative bias of the battery 18 and deprive the control grids of control of their respective valves, with the result that a short circuit is produced across the direct current circuit. This effect could be substantially eliminated by increasing the size of the capacitors 22 and 23 to a very great extent, but on the other hand, the use of very large capacitors 22 and 23 has two distinct disadvantages as pointed out above. In the first place, the use of large capacitors connected between the grid and cathode of the valves so reduces the impedance of the grid circuits that more energy is required for exciting the grid circuits than may be available from the source of control potential. In addition, the presence of a large capacity between the grids and cathodes of the electric valves has the effect of decidedly retarding the grid circuit, that is, causing a time delay in the response of the grid circuit to the control potential, as is well understood by those skilled in the art. However, by completely surrounding the various circuit elements of the grid circuit by a conductive shield 24 and connecting this shield to ground as illustrated, it has been found that the effect of transients in the power circuit upon the grid circuit may be substantially eliminated without materially increasing the size of the grid-cathode capacitors 22 and 23 beyond that required to decrease to a negligible value the potential electrostatically induced upon the grid by transients in the anode circuit. That is, during the intervals $b$ of the curve of Fig. 2, when a positive potential transient appears in the anode circuit of the electric valves, the danger of the valve being rendered conductive due to the grid being deprived of its control by potentials electrostatically induced on the grid or in the grid circuit by transients in the anode circuit, is substantially eliminated.

While I have described my invention as applied to an electric valve converting apparatus of the type known in the art as a parallel inverter, it will be understood that it is in nowise limited thereto but is equally suitable to any electric valve circuit in which the anode of the valve is subjected to periodic or transient potential waves.

While I have described what I at present consider the preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. In an electric translating circuit, the combination of a vapor electric discharge device provided with an anode, a cathode, and a control grid, a power circuit including the anode and cathode of said device, a grid circuit for controlling the conductivity of said valve, and a conductive shield surrounding the elements of said grid circuit and connected to said cathode to prevent transients in said power circuit from electrostatically inducing a potential in said grid circuit whereby said grid is deprived of the control of the conductivity of said valve.

2. In an electric translating circuit, the combination of a vapor electric discharge device provided with an anode, a cathode, and a control grid, a power circuit including the anode and cathode of said device and subject to electric potential waves of steep wave front, a grid circuit for said device including elements having an electrostatic capacity with respect to said power circuit and said cathode, and a conductive shield surrounding the elements of said grid circuit and connected to said cathode to prevent said potential waves in said power circuit from electrostatically inducing a potential in said grid circuit whereby said grid is deprived of control of the conductivity of said valve.

3. In an electric translating circuit, the combination of a vapor electric discharge device provided with an anode, a cathode and a control grid, said anode and grid having a substantial internal capacity, a power circuit including the anode and cathode of said device, a grid circuit for controlling the conductivity of said valve, a capacity connected between said grid and cathode to substantially eliminate the effect on said grid of transients impressed upon said anode, and a conductive shield surrounding the elements of said grid circuit and connected to said cathode to prevent transients in said power circuit from electrostatically inducing a potential in said grid circuit whereby said grid is deprived of the control of the conductivity of said valve.

CLODIUS H. WILLIS.